(12) United States Patent
Cheng et al.

(10) Patent No.: US 8,369,016 B2
(45) Date of Patent: Feb. 5, 2013

(54) OPTICAL SHEET

(75) Inventors: Chih-Cheng Cheng, Taipei County (TW); Hui-Hsiung Lin, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 778 days.

(21) Appl. No.: 12/330,476

(22) Filed: Dec. 8, 2008

(65) Prior Publication Data

US 2010/0079864 A1 Apr. 1, 2010

(30) Foreign Application Priority Data

Oct. 1, 2008 (TW) .............................. 97137756 A

(51) Int. Cl.
*G02B 5/30* (2006.01)
(52) U.S. Cl. .......... 359/489.15; 359/489.16; 359/489.17
(58) Field of Classification Search .............. 349/96–99; 359/485.01–485.04, 489.01, 489.15–489.17
See application file for complete search history.

(56) References Cited

U.S. PATENT DOCUMENTS

| 3,610,729 | A |   | 10/1971 | Rogers |  |
|---|---|---|---|---|---|
| 5,122,890 | A | * | 6/1992 | Makow | 349/96 |
| 5,506,704 | A |   | 4/1996 | Broer et al. |  |
| 5,828,488 | A |   | 10/1998 | Ouderkirk et al. |  |
| 5,962,114 | A |   | 10/1999 | Jonza et al. |  |
| 5,999,316 | A | * | 12/1999 | Allen et al. | 359/485.04 |
| 6,072,629 | A |   | 6/2000 | Fan et al. |  |
| 7,619,704 | B2 | * | 11/2009 | Chu et al. | 349/114 |
| 2008/0024700 | A1 | * | 1/2008 | Yoshimi | 349/96 |
| 2008/0074585 | A1 | * | 3/2008 | Yoshimi | 349/96 |
| 2008/0089095 | A1 | * | 4/2008 | Pan | 362/622 |
| 2010/0177293 | A1 | * | 7/2010 | Fiolka et al. | 355/67 |
| 2011/0199560 | A1 | * | 8/2011 | Sakai | 349/96 |

FOREIGN PATENT DOCUMENTS

| CN | 1515915 | 7/2004 |
|---|---|---|
| CN | 1760719 | 4/2006 |
| CN | 1950745 | 4/2007 |
| JP | 2006-113513 | 4/2006 |

(Continued)

OTHER PUBLICATIONS

Huang et al., "Simulations of liquid-crystal Fabry-Perot etalons by an improved 4X4 matrix method", Journal of Applied Physics, Mar. 1, 2003, pp. 2490-2495, vol. 93, No. 5.

(Continued)

*Primary Examiner* — Frank Font
(74) *Attorney, Agent, or Firm* — Jianq Chyun IP Office

(57) ABSTRACT

An optical sheet including a plurality of optical anisotropic films is provided. The optical anisotropic films of the optical sheet are alternately stacked on one another. Each optical anisotropic film has a plurality of main axis refractive indexes nx, ny and nz. The main axis refractive indexes nx and ny are in-plane main refractive indexes, and the main axis refractive index nz is a thickness-wise refractive index. The main axis refractive index nx is the minimum or the maximum among the main axis refractive indexes nx, ny and nz. Each optical anisotropic film has an optcial axis, and a direction of the optical axis is the same to a main axis direction of the main axis refractive index nx. The optical axes of the optical anisotropic films sequentially rotates along a predetermined in a thickness direction, and a totally rotation angle thereof is greater than or equal to 360 degrees.

14 Claims, 13 Drawing Sheets

FOREIGN PATENT DOCUMENTS

| | | |
|---|---|---|
| JP | 3935936 | 6/2007 |
| WO | 9743671 | 11/1997 |

OTHER PUBLICATIONS

Popov et al., "Broadband high-reflection multilayer coatings at oblique angles of incidence", Applied Optics, Apr. 1, 1997, pp. 2139-2151, vol. 36, No. 10.

Weber et al., "Giant Birefringent Optics in Multilayer Polymer Mirrors", Science, Mar. 31, 2000, pp. 2451-2456, vol. 287.

"Office Action of Taiwan Counterpart Application", issued on Jun. 25, 2012, p. 1-p. 6.

"Office Action of Japan Counterpart Application", issued on Nov. 6, 2012, p1-p1.

\* cited by examiner

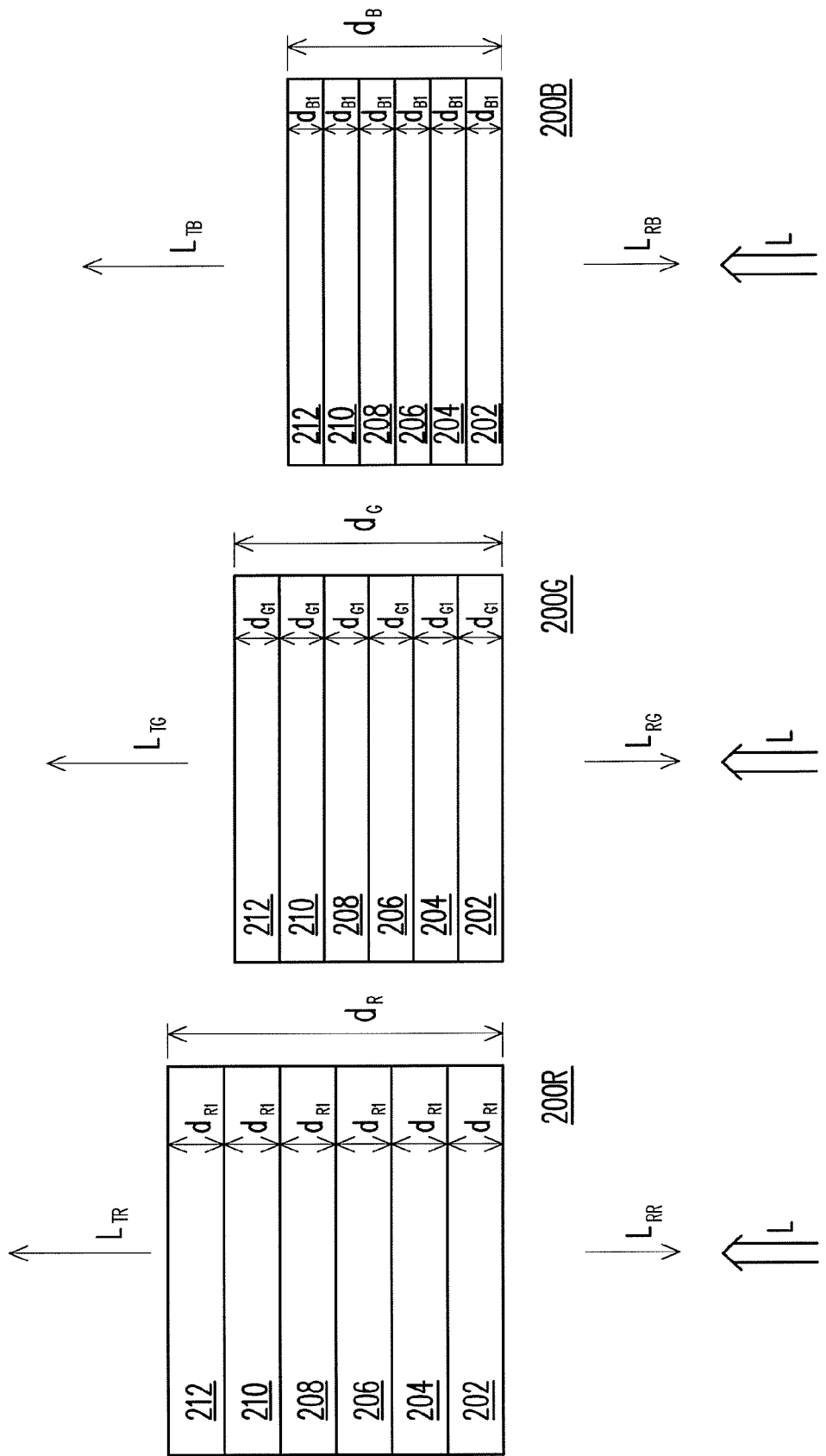

OPTICAL SHEET

CROSS-REFERENCE TO RELATED APPLICATION

This application claims the priority benefit of Taiwan application serial no. 97137756, filed on Oct. 1, 2008. The entirety of the above-mentioned patent application is hereby incorporated by reference herein and made a part of this specification.

BACKGROUND OF THE INVENTION

1. Field of the Invention

The present invention relates to an optical sheet. More particularly, the present invention relates to an optical sheet simultaneously having a refractive function and a reflective function.

2. Description of Related Art

With development of technology, display devices are widely used in people's daily life, in which flat panel displays (FPDs) become popular due to its features of light-weight and thin-size. In various FPDs, liquid crystal displays (LCDs) are widely used due to its advantages of high space usage rate, low power consumption, no radiation and low electromagnetic interference, etc.

FIG. 1 is a cross-sectional view of a conventional LCD. Referring to FIG. 1, the LCD 100 includes a liquid crystal panel 110 and a backlight source 120, wherein the backlight source 120 is used for providing an incident light L to the liquid crystal panel 110. In detail, the liquid crystal panel 110 generally includes an upper polarizer 110a, an upper substrate 110b, a liquid crystal layer 110c, a lower substrate 110d and a lower polarizer 110e. After the light L provided by the backlight source 120 enters the liquid crystal panel, the lower polarizer 110d polarizes the light L emitted from the backlight source 120 into a polarized light $L_T$. Based on different rotations of liquid crystal molecules in the liquid crystal layer 110c, transmissivities of the polarized light $L_T$ in different regions can be varied. Then, the polarized light $L_T$ is emitted from the upper polarizer 110a. By such means, the liquid crystal panel 110 can achieve a display effect.

Though the upper polarizer 110a and the lower polarizer 110e can polarize the light L to assist an optical effect of an image displayed by the LCD 100, the light L may have a loss when passing through the upper polarizer 110a and the lower polarizer 110e, so that the light L emitted form the backlight source 120 may have an energy depletion within the LCD 100, and accordingly a brightness performance of the LCD 100 is influenced. Generally, the upper polarizer 110a and the lower polarizer 110e are applications of optical sheets. Therefore, how to suitably design a structure of the optical sheet to improve a light usage rate of the LCD 100 is a major challenge required to be ocvercomed for the FPDs.

SUMMARY OF THE INVENTION

The present invention is directed to an optical sheet, in which light passing through the optical sheet may have a relatively high separation efficiency and relatively high light usage rate.

The present invention is directed to another optical sheet, which can reduce an energy depletion of an incident light.

The present invention provides an optical sheet including a plurality of optical anisotropic films mutually stacked on one another. Each of the optical anisotropic films has a plurality of main axis refractive indexes nx, ny and nz. Wherein, the main axis refractive indexes nx and ny are in-plane main axis refractive indexes, and the main axis refractive index nz is a thickness-wise refractive index. In addition, the main axis refractive index nx of each optical anisotropic film is a minimum or a maximum among the main axis refractive indexes nx, ny and nz of the optical anisotropic film, and each optical anisotropic film has an optical axis, and a direction of the optical axis is substantially the same to a main axis direction of the main axis refractive index nx. The optical axes of the optical anisotropic films of the optical sheet sequentially rotate along a predetermined rotation direction in a thickness direction of the optical anisotropic films, and a total rotation angle thereof is substantially greater than or equal to 360 degrees.

The present invention provides another optical sheet including a plurality of optical anisotropic films mutually stacked on one another and a λ/4 phase retardation film, wherein the λ/4 phase retardation film is disposed on the optical anisotropic films. Each of the optical anisotropic films has a plurality of main axis refractive indexes nx, ny and nz. Wherein, the main axis refractive indexes nx and ny are in-plane main axis refractive indexes, and the main axis refractive index nz is a thickness-wise refractive index. In addition, the main axis refractive index nx of each optical anisotropic film is the minimum or the maximum among the main axis refractive indexes nx, ny and nz, and each optical anisotropic film has an optical axis, and a direction of the optical axis is the same to a main axis direction of the main axis refractive index nx. The optical axes of the optical anisotropic films sequentially rotate along a predetermined rotation direction in a thickness direction of the optical anisotropic films, and a total rotation angle thereof is substantially greater than or equal to 360 degrees.

In the present invention, the optical sheet has a plurality of optical anisotropic films mutually stacked on one another, wherein the optical axes of the optical anisotropic films sequentially rotate along a predetermined rotation direction in a thickness direction of the optical anisotropic films, and a total rotation angle of the optical axes is greater than or equal to 360 degrees, so that an incident light is separated into two polarized light with different polarization directions after passing through the optical sheet, wherein one of the polarized light with the polarization direction being the same to the predetermined rotation direction is reflected for recycling, and another polarized light penetrates the optical sheet for displaying. Therefore, the optical sheet of the present invention can reduce the energy depletion of the incident light.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2E and FIG. 2F are cross-sectional views of other six optical sheets according to a first embodiment of the present invention.

DESCRIPTION OF EMBODIMENTS

An optical sheet of the present invention has a special structure, in which light passing through the optical sheet can obtain a desired optical effect. In detail, the light is separated into polarized light after passing through the optical sheet, wherein a part of the polarized light can penetrate the optical sheet, and the remaining part of the light is reflected by the optical sheet for recycling. In the following embodiment, the structure of the optical sheet and a mechanism for the light passing through the optical sheet are described in detail.

First Embodiment

Figure 1:
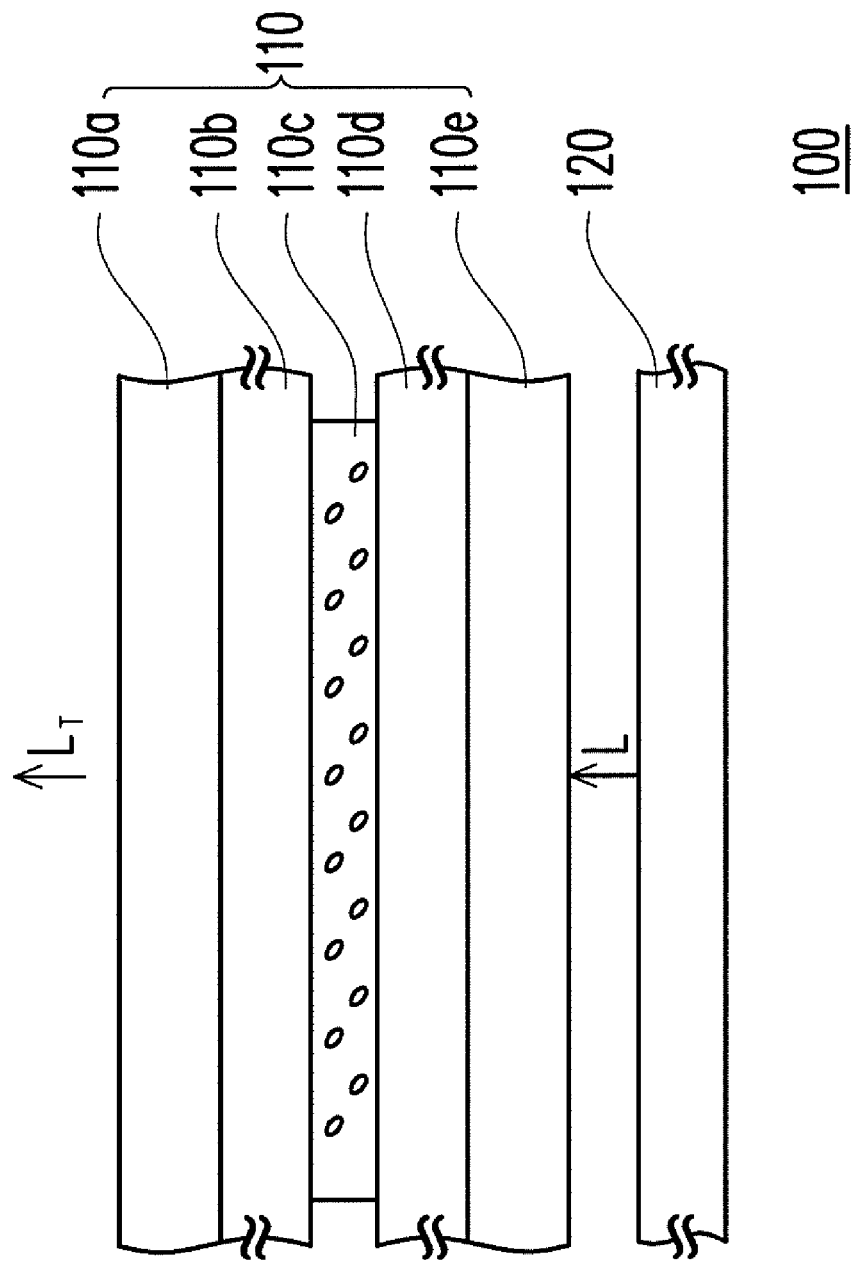
FIG. 1 is a cross-sectional view of a conventional LCD.
Figure 2A:
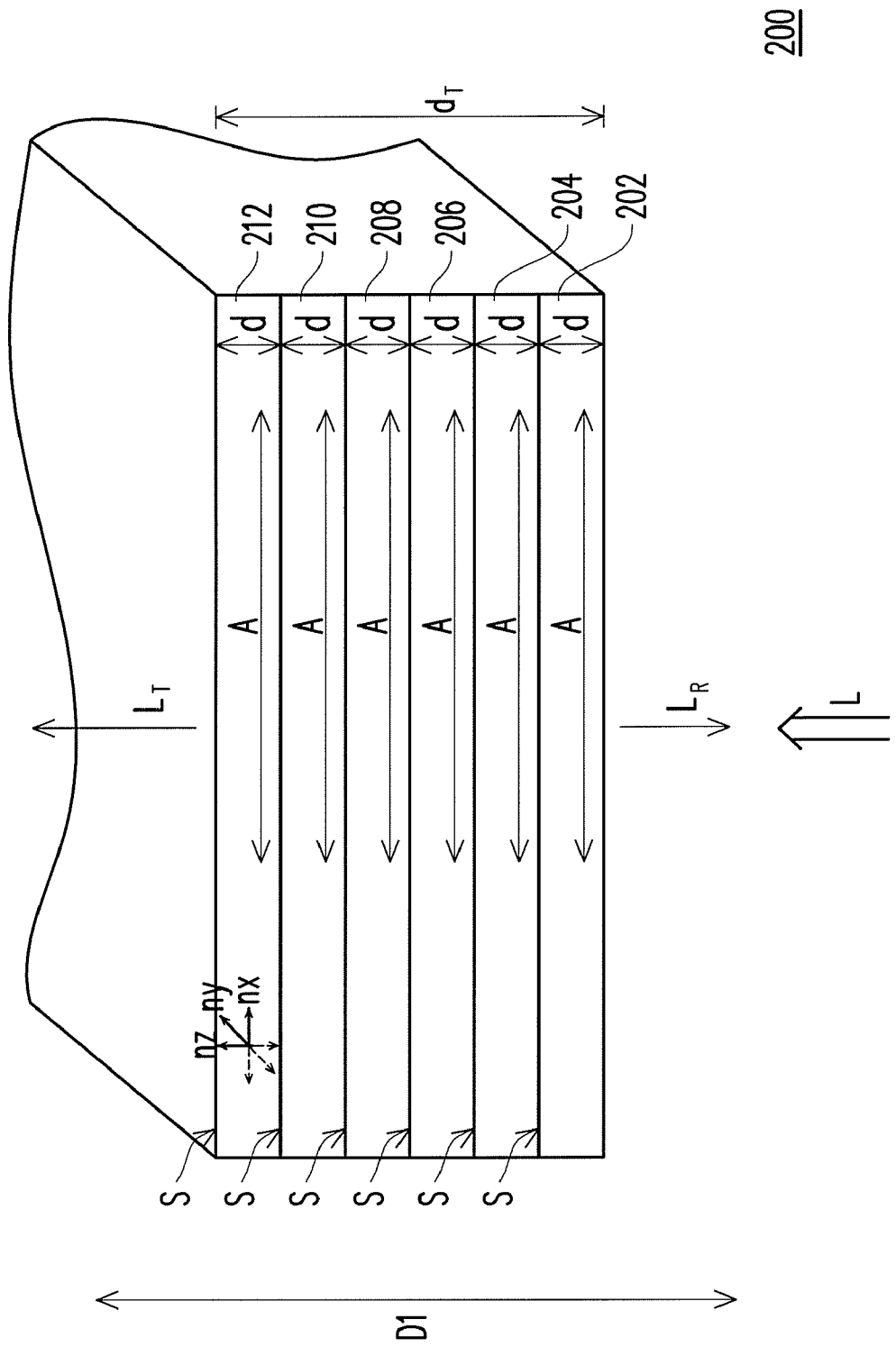
FIG. 2A is a cross-sectional view of an optical sheet according to an embodiment of the present invention.
Figure 2B:
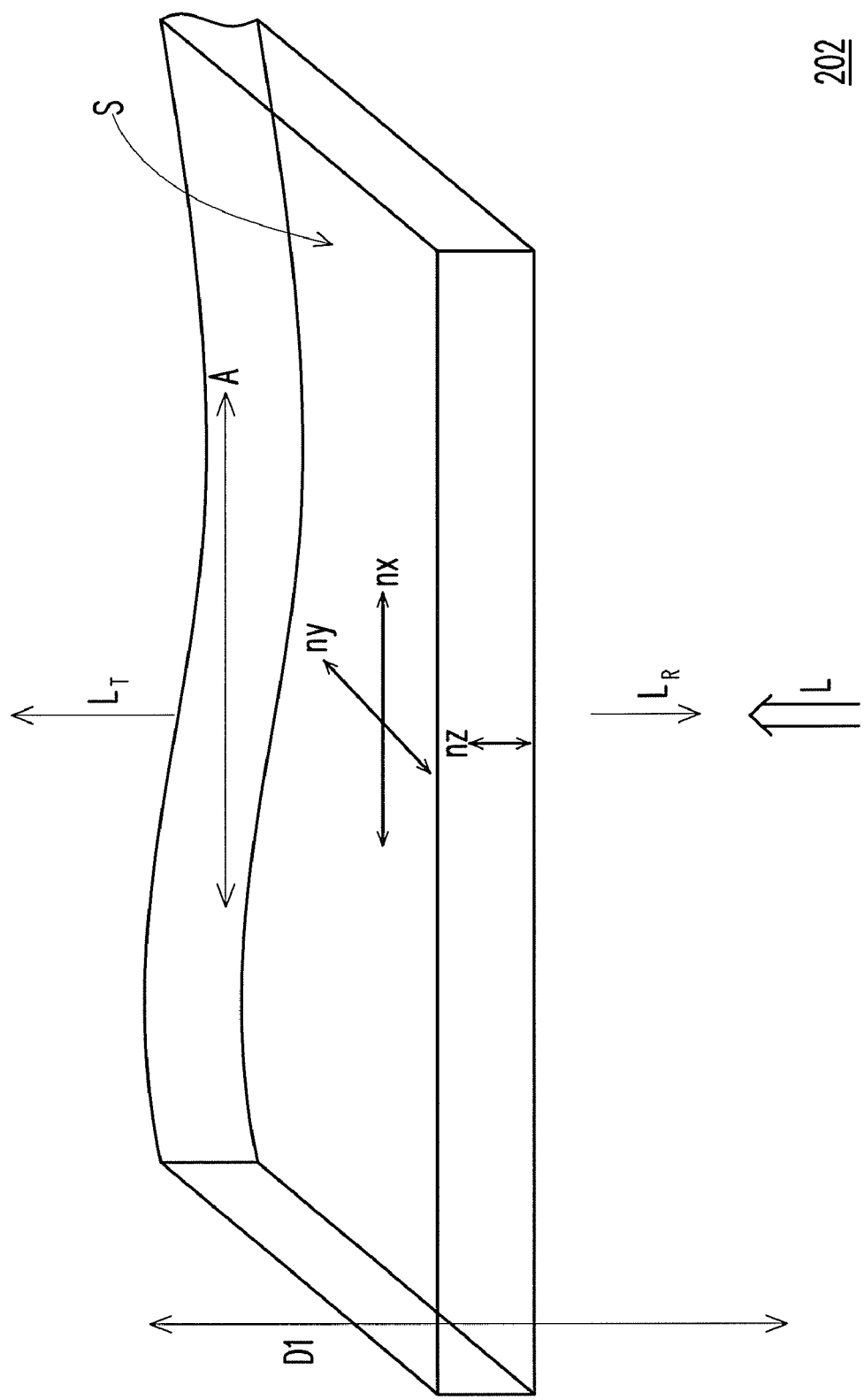
FIG. 2B is a partial three-dimensional diagram illustrating one of optical anisotropic films of FIG. 2A.

FIG. 2A is a cross-sectional view of an optical sheet according to an embodiment of the present invention. FIG. 2B is a partial three-dimensional diagram illustrating one of optical anisotropic films of FIG. 2A. Referring to FIG. 2A and FIG. 2B, the optical sheet 200 includes a plurality of optical anisotropic films 202, 204, 206, 208, 210 and 212, wherein the optical anisotropic films 202, 204, 206, 208, 210 and 212 are mutually stacked on one another. It should be noted that the six layers of optical anisotropic films 202, 204, 206, 208, 210 are only used as an example, which is not used for limiting a structure of the optical sheet 200 of the present invention. Moreover, in other embodiments, the optical sheet can further include an optical isotropic film disposed between two adjacent optical anisotropic films (for example, 202 and 204 or 204 and 206).

Each of the optical anisotropic films 202-212 has a plurality of main axis refractive indexes nx, ny and nz. Wherein, the main axis refractive indexes nx and ny are in-plane main axis refractive indexes, and the main axis refractive index nz is a thickness-wise refractive index. In other words, advancing speed of the light in the optical anisotropic film is able to be different according to different directions of the film layers. In addition, the main axis refractive index nx of each of the optical anisotropic films 202-212 is the minimum or the maximum among the main axis refractive indexes nx, ny and nz.

More specifically, the main axis refractive index nx of each of the optical anisotropic films 202-212 is, for example, the maximum among the main axis refractive indexes nx, ny and nz, in other words, in the present embodiment, each of the optical anisotropic films 202-212 belongs to a positive refractive index anisotropy material, i.e. $\Delta n>0$. Certainly, the main axis refractive index nx of each of the optical anisotropic films 202-212 can also be the minimum among the main axis refractive indexes nx, ny and nz, and each of the optical anisotropic films 202-212 belongs to a negative refractive index anisotropy material, i.e. $\Delta n<0$. In addition, each of the optical anisotropic films 202-212 has an optical axis A, and a direction of the optical axis A is substantially the same to a main axis direction of the main axis refractive index nx. In other words, the refractive index of each of the optical anisotropic films 202-212 in the direction of the optical axis A is the main axis refractive index nx.

In the present embodiment, the main axis refractive indexes nx, ny and nz of each of the optical anisotropic films 202-212 satisfy an equation of $ny=nz\neq nx$. Namely, in each of the optical anisotropic films 202-212, the refractive index nx of the optical axis A forms an extraordinary refractive index ne, and the refractive indexes ny and nz perpendicular to the direction the optical axis A form an ordinary refractive index no. Therefore, in some embodiments of the present invention, the main axis refractive indexes nx, ny and nz, the extraordinary refractive index ne and the ordinary refractive index no satisfy equations of $ne=nx$ and $no=ny=nz$, so that each of the optical anisotropic films can be regarded as a birefringence material having a single optical axis. In brief, the optical sheet 200 of the present embodiment has a feature of birefringence, so that the light L can be separated into two polarized light $L_T$ and $L_R$ (which are described later) after passing through any of the optical anisotropic films 202-208 or the optical anisotropic film 210. However, in other embodiments, each of the optical anisotropic films can also be the birefringence material having two optical axes, so that the main axis refractive indexes nx, ny and nz of the optical anisotropic films satisfy an equation of $nx\neq ny\neq nz$.

Each of the optical anisotropic films 202-212 of the optical sheet 200 preferably has the same main axis refractive indexes nx, ny and nz. However, when the main axis refractive indexes nx of the adjacent optical anisotropic films (for example, 202 and 204, etc.) of the optical sheet 200 have a difference substantially less than or equal to 0.05, the optical sheet still has a good optical performance. Similarly, the main axis refractive indexes ny or the main axis refractive indexes nz of the adjacent optical anisotropic films can also have a difference substantially less than or equal to 0.05. In other words, the main axis refractive indexes nx, ny and nz of the adjacent optical anisotropic films (for example, 202 and 204, etc.) in the optical sheet 200 of the present invention are allowed to be slightly different due to a fabrication variation or other factors.

In the present embodiment, each of the optical anisotropic films 202-212 has a surface S. Theoretically, while combining the optical anisotropic films 202-212, an angle formed between the main axis direction of the main axis refractive index nx and the surface S in each of the optical anisotropic films 202-212 is preferably 0 degree. However, in the optical sheet 200 of the present invention, even if the angle formed between the main axis direction of the main axis refractive index nx and the surface S is about 10 degrees, the optical sheet 200 can still achieve a separating function that a part of the polarized light can pass there through and another part of the polarized light is reflected thereon. In other words, the angle formed between the surface S and the main axis direction of the main axis refractive indexes nx, ny and nz is allowed to be greater than 0 degree due to a fabrication factor or other factors.

Figure 2C:
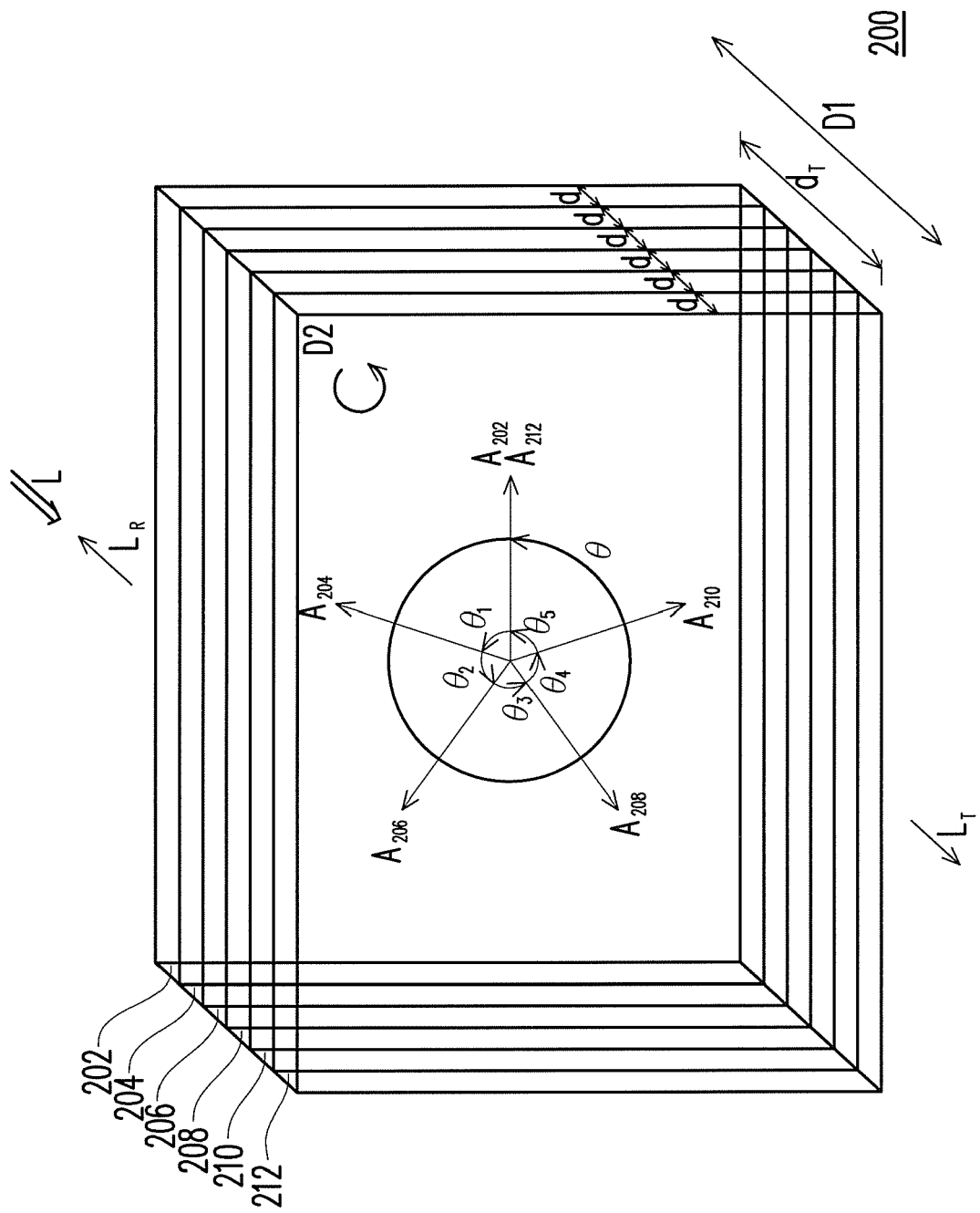
FIG. 2C is a three-dimensional diagram of an optical sheet of FIG. 2A.

FIG. 2C is a three-dimensional diagram of the optical sheet of FIG. 2A. Referring to FIG. 2C, in the optical sheet 200 of the present embodiment, the optical axes A of the optical anisotropic films 202-212 sequentially rotate along a predetermined rotation direction D2 in a thickness direction D1 of the optical anisotropic films 202-212. It should be noted that the predetermined rotation direction D2 can be an anticlockwise direction, a clockwise direction or other suitable directions, and the in the present embodiment, the anticlockwise direction is taken as an example. A total rotation angle θ of the optical axes A is for example 360 degrees. Therefore, after the light L enters the optical sheet 200, the light L is separated into to two polarized light $L_T$ and $L_R$ having reversed polarization directions according to rotation directions of the optical axes A in the optical anisotropic films 202-212. In the present embodiment, the polarized light $L_T$ is a left-hand circularly polarized light, and can penetrate the optical sheet 200 against the sequentially rotation direction of the optical axes A (i.e. the predetermined rotation direction D2). On the other hand, the part of light with the polarization direction being the same to the rotation direction of the optical axis A (i.e. the predetermined rotation direction D2) within the light L can be reflected by the optical sheet 200, so that the polarized light $L_R$ can be a right-hand circularly polarized light. Certainly, in other embodiments, the predetermined rotation direction D2 can also be selectively designed to be the clockwise direction according to actual applications of the product, so that the left-hand circularly polarized light can be reflected by the optical sheet 200, and the right-hand circularly polarized light can penetrate the optical sheet 200, which are all determined according to actual applications.

It should be noted that in the optical sheet 200, the total rotation angle θ is substantially greater than or equal to 360 degrees, namely, the total rotation angle θ of each of the optical anisotropic films 202-212 is allowed to be unequal to 360 degrees due to the fabrication factor or other factors.

Referring to FIG. 2A and FIG. 2C, when the total rotation angle θ is substantially equal to 360 degrees, a sum of thickness d of the optical anisotropic films 202-212 forms a pitch $d_T$. For example, the optical sheet 200 of the present embodiment is, for example, formed by six layers of the optical anisotropic films 202-212, and the optical axes of the sequentially stacked optical anisotropic films 202, 204, 206, 208, 210 and 212 are respectively $A_{202}$, $A_{204}$, $A_{206}$, $A_{208}$, $A_{210}$ and $A_{212}$. Moreover, angles $\theta_1$-$\theta_5$ are respectively formed between $A_{202}$ and $A_{204}$, $A_{204}$ and $A_{206}$, $A_{206}$ and $A_{208}$, $A_{208}$ and $A_{210}$, and between $A_{210}$ and $A_{212}$. As shown in FIG. 2C, the optical axes $A_{202}$, $A_{204}$, $A_{206}$, $A_{208}$, $A_{210}$ and $A_{212}$ sequentially rotate anticlockwise, and the angles $\theta_1$-$\theta_5$ formed between the optical axes of two adjacent optical anisotropic films are substantially 72 degrees. Accordingly, other combinations can be deduced by analogy.

Figure 2D:
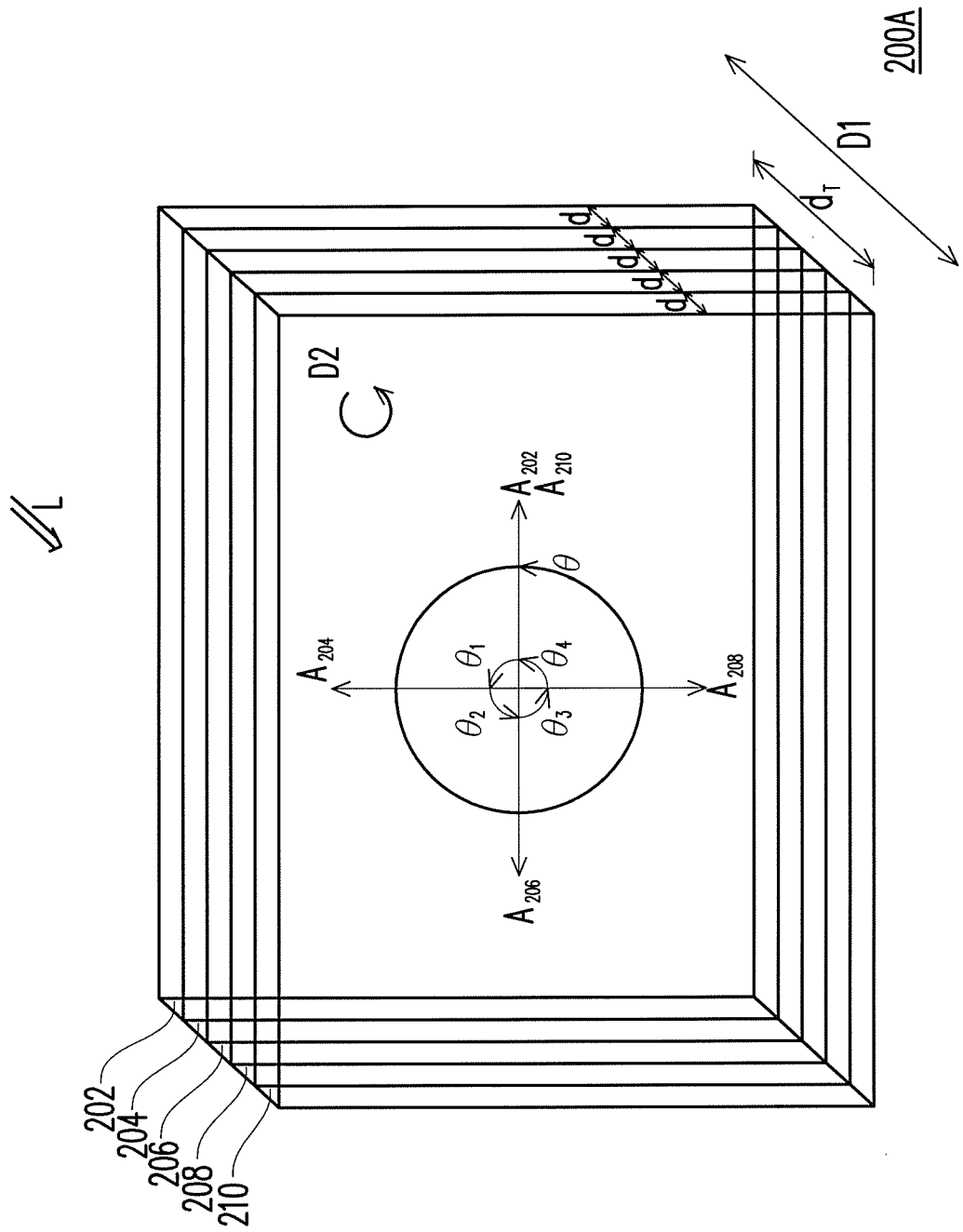
FIG. 2D is a three-dimensional diagram of another optical sheet according to an embodiment of the present invention.

It should be noted that as shown in FIG. 2D, in other embodiments, if an optical sheet 200A is, for example, formed by five layers of the optical anisotropic films 202-210, and the angles $\theta_1$-$\theta_4$ formed between the optical axes of two adjacent optical anisotropic films are all 90 degrees, the optical sheet 200A can be a reflective filter sheet.

The optical sheet 200 of the present embodiment has a structure for separating the light into polarized light with different polarization directions, so that a part of the polarized light is emitted from a surface of the optical sheet 200, and another part of the polarized light is reflected by an original incident surface for recycling. The optical sheet 200 has a high separation efficiency for separating the light into the aforementioned transmissive polarized light and the reflective polarized light. In detail, in the present embodiment, a separating rate for separating the light L into the polarized light $L_T$ and the polarized $L_R$ can be defined as a proportion of the left-hand circularly polarized light in the transmissive polarized light $L_T$, or can be defined as a proportion of the right-hand circularly polarized light in the reflective polarized light $L_R$. It should be noted that considering a sum of the transmissivity and the reflectivity is 100%, when the optical sheet 200 is formed by stacking relatively more optical anisotropic films, the optical sheet 200 can accord the polarization direction of the transmissive polarized light $L_T$ with the polarization direction of the reflective polarized light $L_R$. For example, the transmissive polarized light $L_T$ only has the left-hand circularly polarized light, and the reflective polarized light $L_R$ only has the right-hand circularly polarized light. Now, the optical sheet 200 has preferred separation efficiency for the light L.

As described above, number of layers of the stacked optical anisotropic films 202-212 relates to the angle (for example $\theta_1$) formed between the optical axes A of two adjacent optical anisotropic films (for example, 202 and 204), so that the optical sheet 200 may have a preferred total rotation angle θ. However, in an optical sheet of another embodiment, different angles can be formed between the optical axes of two adjacent optical anisotropic films, for example, $\theta_1$ is not equal to $\theta_2$. Namely, for a total rotation angle θ, angles formed between the optical axes A of two adjacent optical anisotropic films are not limited to be equal, which can be determined according to actual applications.

It should be noted that the optical sheet 200 having the pitch $d_T$ can reflect the polarized light with a specific wavelength. In detail, the so-called specific wavelength relates to a wave band formed by a center wavelength λ and a bandwidth W, wherein the pitch $d_T$, the center wavelength λ and the bandwidth W respectively satisfy following equations: $\lambda=(ne+no)/2 \times d_T$ and $W=|(ne-no) \times d_T|$. According to another aspect, the polarized light with a specific wavelength can penetrate the optical sheet 200 having the pitch $d_T$. For example, as shown in FIG. 2E, in the present embodiment, when the light L passes through the optical sheet 200 having the pitch $d_R$, and the predetermined rotation direction D2 of the optical sheet 200 is the anticlockwise direction, the optical sheet 200R is suitable for reflecting a red light $L_{RR}$ with the right-hand circular polarization direction, and a red light $L_{TR}$ with the left-hand circular polarization direction can penetrate the optical sheet 200R. Similarly, when the light L respectively passes through an optical sheet 200G or 200B having a pitch of $d_G$ or $d_B$, the optical sheets 200 and 200B can respectively reflect a green light $L_{RG}$ and a blue light $L_{RB}$ with the right-hand circular polarization direction, and a green light $L_{TG}$ and a blue light $L_{TB}$ with the left-hand circular polarization direction can respectively penetrate the optical sheets 200G and 200B.

Figure 2F:
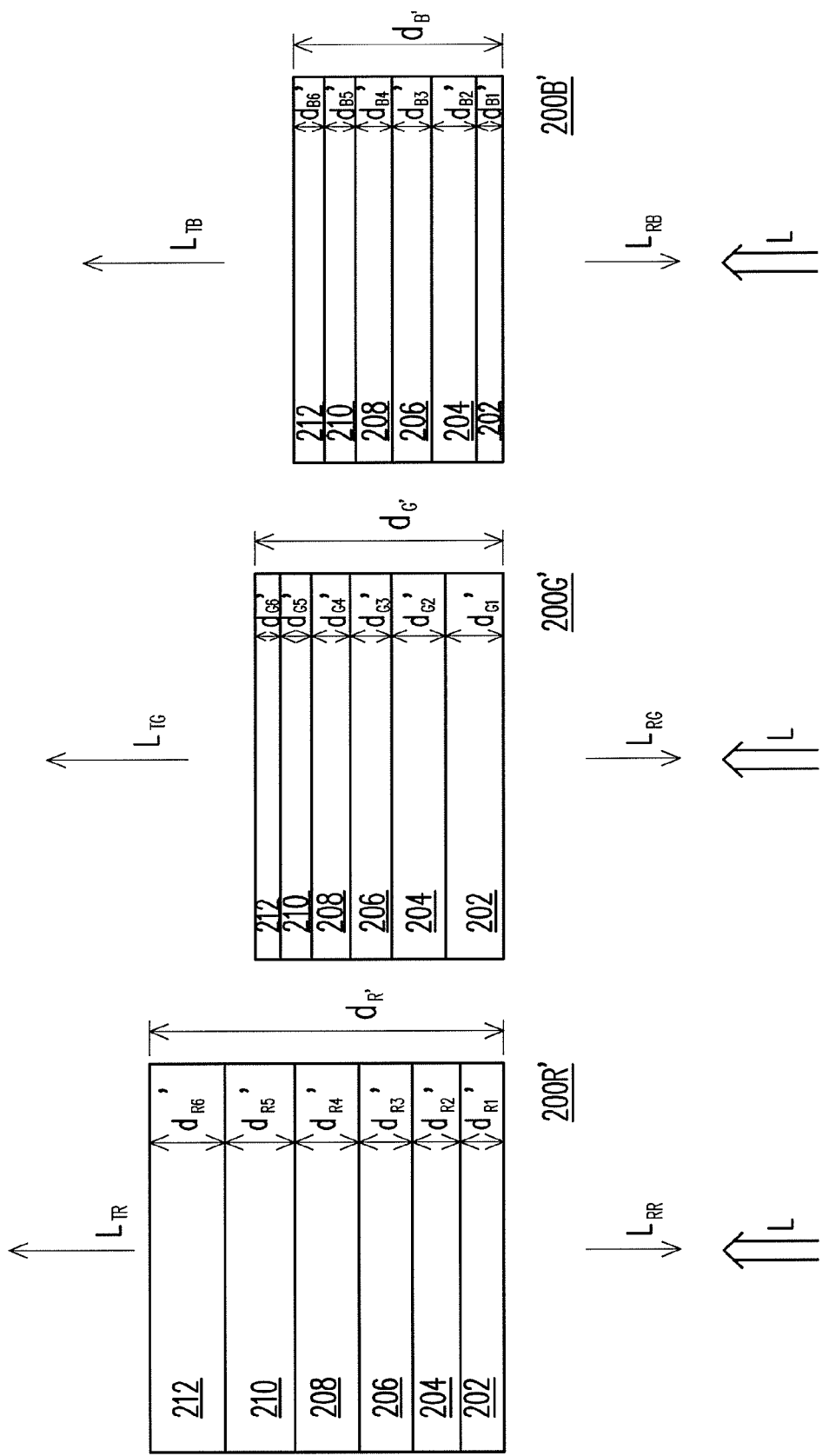

In the present embodiment, thickness of the each of the optical anisotropic films 202-212 in the optical sheet 200 is for example the same. As shown in FIG. 2E, the pitches $d_R$, $d_G$ and $d_B$ are, for example, respectively formed by six layers of the same thickness $d_{R1}$, $d_{G1}$ and $d_{B1}$. However, in other embodiments, the thickness of the optical anisotropic films of the optical sheet can be different. As shown in FIG. 2F, pitches $d_R'$, $d_G'$ and $d_B'$ of optical sheets 200R', 200G' and 20DB' are, for example, respectively formed by different thickness $d_{R1}'$-$d_{R6}'$, $d_{G1}'$-$d_{G6}'$ and $d_{B1}'$-$d_{B6}'$. In brief, for each of the pitches, the thickness of each of the optical anisotropic films is not limited to be the same.

Accordingly, in the present embodiment, based on the optical sheets 200, 200R, 200G, 200B, 200R', 200G' and 200B', the specific polarized light with specific wavelengths can be obtained by adjusting values of the pitches $d_T$, $d_R$, $d_G$, $d_B$, $d_R'$, $d_G'$ and $d_B'$, wherein a corresponding part of the light with the specific polarization direction can penetrate the optical sheet, and another corresponding part of the light with the specific polarization direction can be reflected by the optical sheet.

Conventionally, In the LCD, a part of the light emitted from a light source can penetrate the polarizers, and the remained part of the light are lost when passing through the polarizers, so that the light emitted from the light source may have an energy depletion within the LCD, and accordingly the light emitted from the light source cannot be effectively utilized. Different from the conventional technique, in the present invention, the optical sheet is applied to the LCD, so that the light reflected by the optical sheet can be guided to enter the optical sheet again by applying a material or a device having a reflective feature, and accordingly the light within the LCD can be effectively utilized, and a brightness performance of the LCD can be improved.

Second Embodiment

Figure 3A:
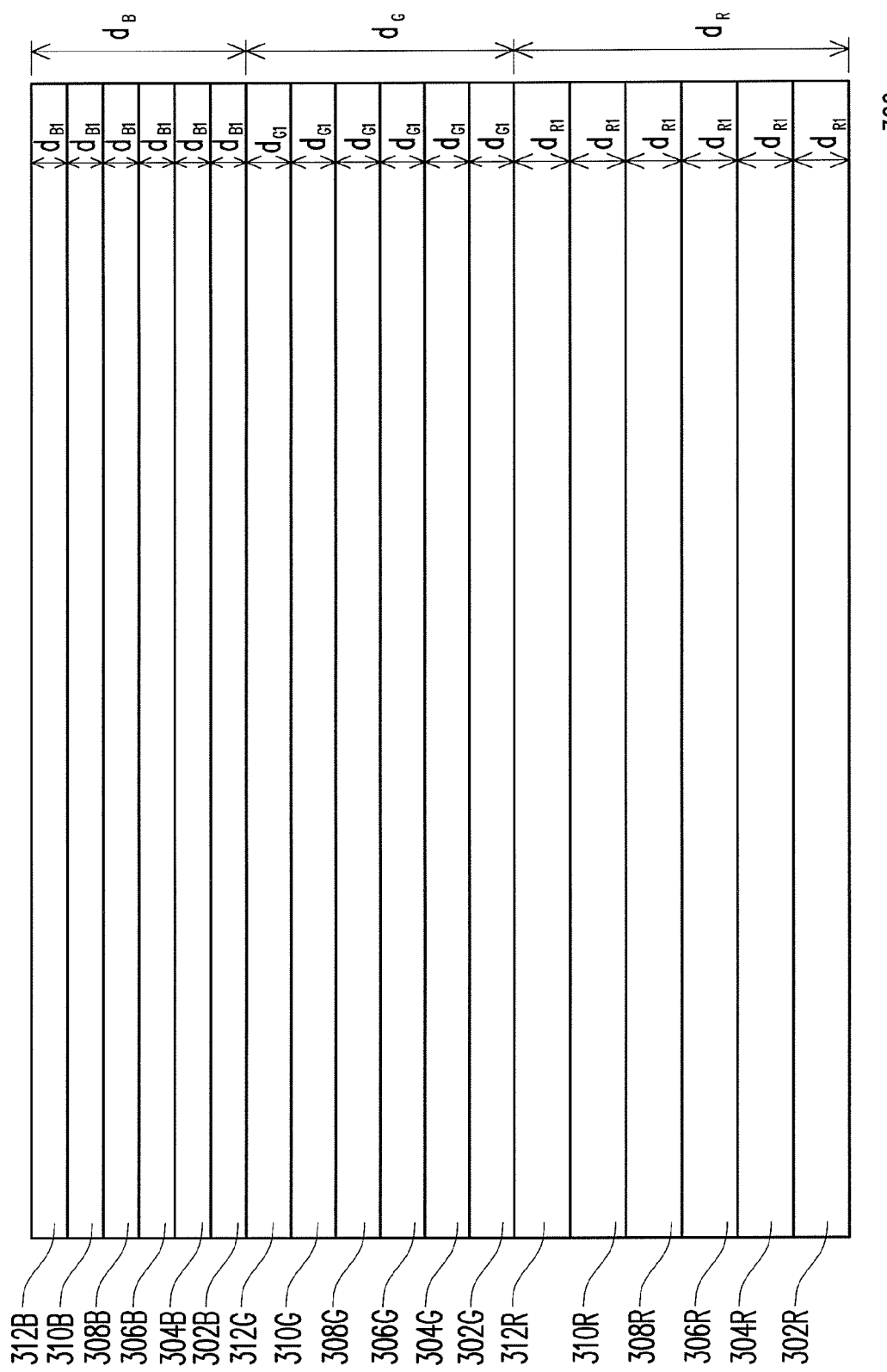
FIG. 3A is a cross-sectional view of an optical sheet according to a second embodiment of the present invention.

FIG. 3A is a cross-sectional view of an optical sheet according to the second embodiment of the present invention. Referring to FIG. 3A, the present embodiment is similar to the first embodiment, and a difference there between is that the optical sheet 300 of the present embodiment has a plurality of pitches $d_R$, $d_G$ and $d_B$, and a set of optical anisotropic films 302G-312G forming the pitch $d_G$ are located between a set of optical anisotropic films 302R-312R forming the pitch $d_R$ and a set of optical anisotropic films 302B-312B forming the pitch $d_B$.

In the present embodiment, a combination of the optical anisotropic films 302R-312R, 302G-312G or the 302B-312B of each of the pitches $d_R$, $d_G$ and $d_B$ is suitable for reflecting the polarized light with a different specific wavelength. Wherein, the polarization directions of the polarized light can be determined according to rotation directions of the optical axes in the optical anisotropic films 302R-312R, 302G-312G or the 302B-312B, which is not limited by the present invention. For example, in the present embodiment, the combination of the optical anisotropic films 302R-312R forming the pitch $d_R$ is suitable for reflecting a red light with a specific polarization direction, the combination of the optical anisotropic films 302G-312G forming the pitch $d_G$ is suitable for reflecting a green light with a specific polarization direction, and the combination of the optical anisotropic films 302B-312B forming the pitch $d_B$ is suitable for reflecting a blue light with a specific polarization direction. Therefore, when the optical sheet 300 of the present embodiment is applied to the LCD, an energy depletion of the light source is able to reduce and a whole brightness performance of the LCD can be improved.

In the present embodiment, the optical anisotropic films forming a pitch have the same thickness. To be specific, the optical anisotropic films 302R-312R forming the pitch $d_R$ have the same thickness $d_{R1}$, the optical anisotropic films 302G-312G forming the pitch $d_G$ have the same thickness $d_{G1}$, and the optical anisotropic films 302B-312B forming the pitch $d_B$ have the same thickness $d_{B1}$. However, in other embodiment, the optical anisotropic films forming a pitch may have different thickness.

Figure 3B:
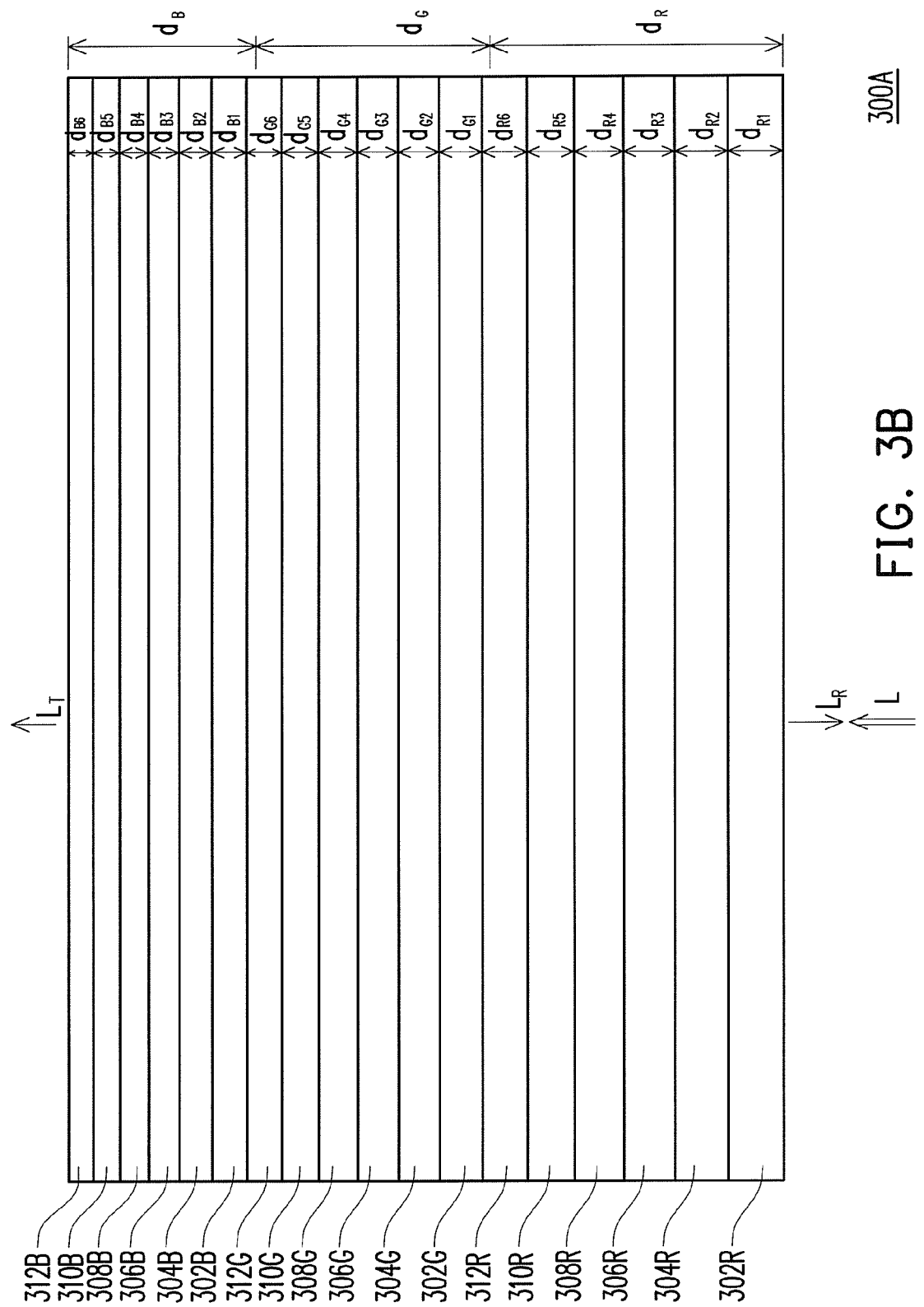
FIG. 3B is a cross-sectional view of another optical sheet according to a second embodiment of the present invention.

Particularly, the thickness of each of the optical anisotropic films in the optical sheet of the present embodiment can be arranged increasingly or decreasingly, wherein each of the angles of the total rotation angles of the optical sheet is accordingly increased or decreased. For example, FIG. 3B is a cross-sectional view of another optical sheet according to the second embodiment of the present invention. Referring to FIG. 3B, the optical sheet 300A includes one set of the optical anisotropic films 302R-312R forming the pitch $d_R$, one set of the optical anisotropic films 302G-312G forming the pitch $d_G$ and one set of the optical anisotropic films 302B-312B forming the pitch $d_B$. As shown in FIG. 3B, each of the thickness $d_{R1}$-$d_{R6}$, $d_{G1}$-$d_{G6}$ and $d_{B1}$-$d_{B6}$ of each of the optical anisotropic films 302R-312R, 302G-312G and 302B-312B respectively forming the pitches $d_R$, $d_G$ and $d_B$ are, for example, gradually decreased. Certainly, in other embodiments, the thickness $d_{R1}$-$d_{R6}$, $d_{G1}$-$d_{G6}$ and $d_{B1}$-$d_{B6}$ can also be gradually increased.

Figure 3C:
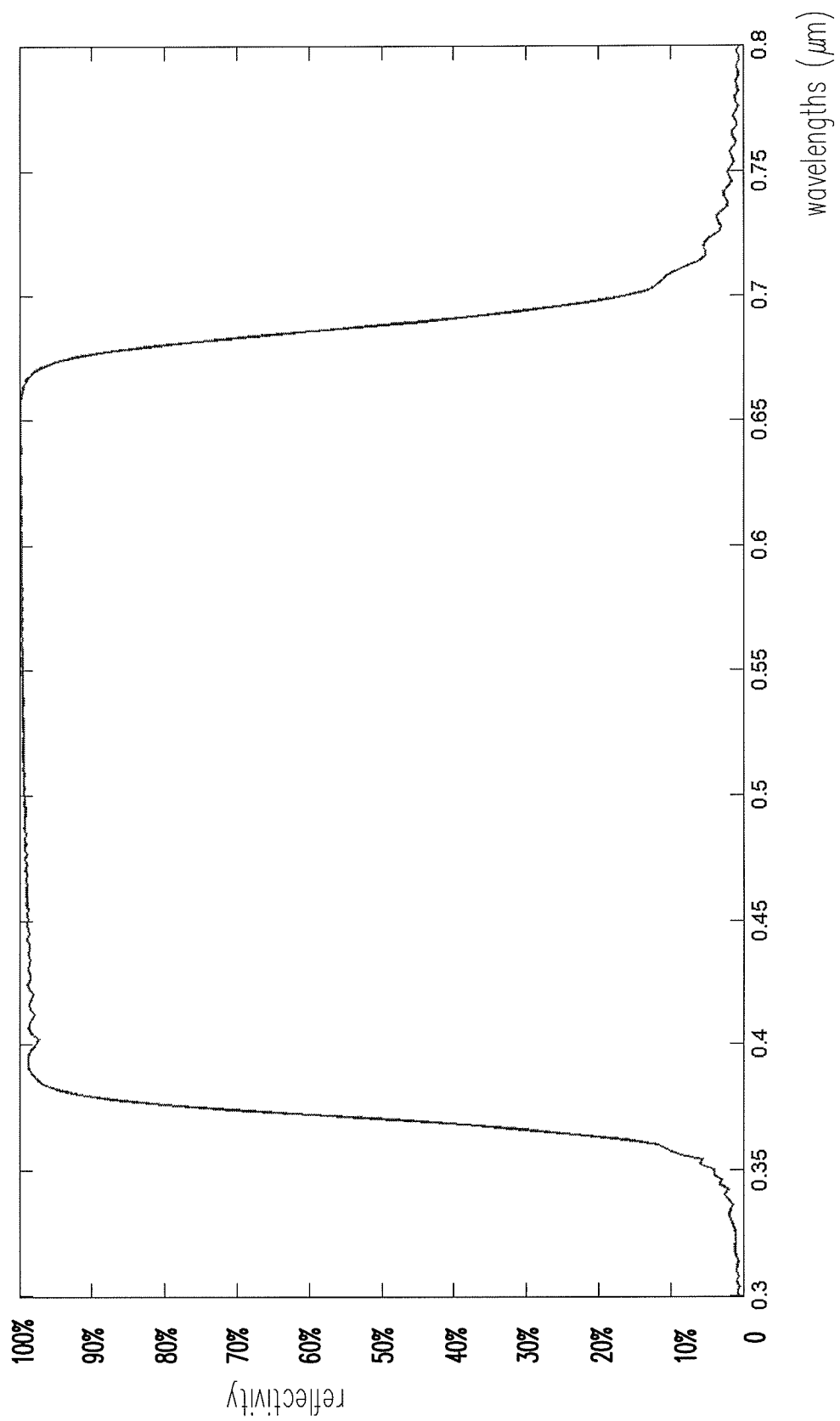
FIG. 3C is a diagram illustrating relations between reflectivity and wavelengths of polarized light according to a second embodiment of the present invention.

Since the optical sheet 300A separates the incident light L into the polarized light $L_T$ and the polarized light $L_R$, when the thickness of each of the optical anisotropic films of the same pitch is arranged decreasingly (or increasingly), the polarized light $L_R$ has a relatively great bandwidth. In a preferred embodiment, the bandwidth of the polarized light $L_R$ is a bandwidth of a visible light (i.e. white light), which is shown as FIG. 3C. FIG. 3C is a diagram illustrating relations between reflectivity and wavelengths of the polarized light.

Figure 3D:
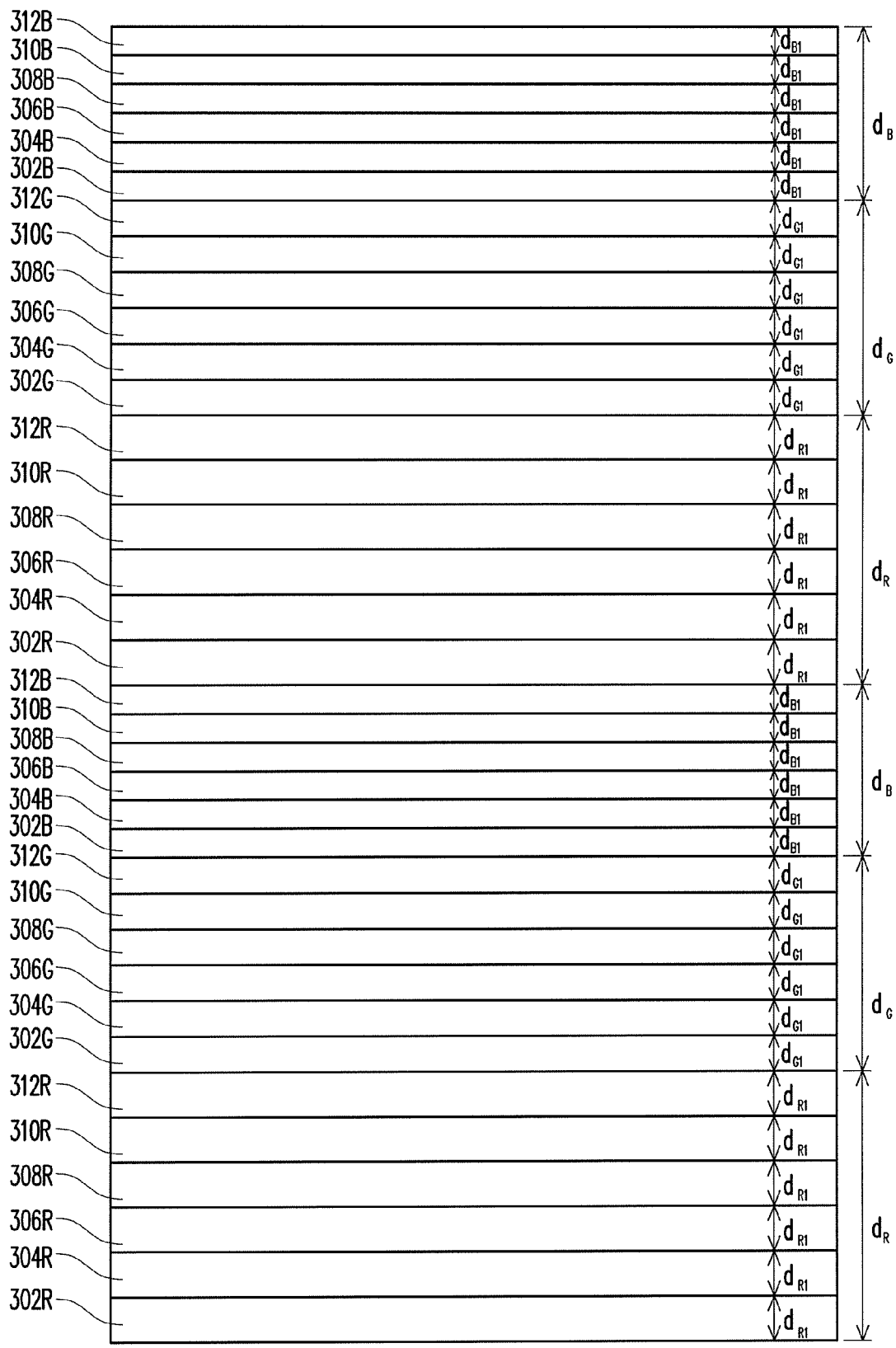
FIG. 3D is a cross-sectional view of another optical sheet according to a second embodiment of the present invention.

It should be noted that the optical anisotropic films 302R-312R, 302G-312G and 302B-312B can be further stacked to form an optical sheet 300' having a plurality of the pitches $d_R$, a plurality of the pitches $d_G$ and a plurality of the pitches $d_B$. For example, as shown in FIG. 3D, the optical sheet 300' includes two sets of the optical anisotropic films 302R-312R having the pitch of $d_R$, two sets of the optical anisotropic films 302G-312G having the pitch of $d_G$, and two sets of the optical anisotropic films 302B-312B having the pitch of $d_B$. Wherein, the thickness of each of the pitches is determined according to actual applications, which is not limited by the present invention. Since the optical sheet 300' has a plurality of the optical anisotropic films with the same pitch, the incident light may have a better separation effect after passing through the optical sheet 200.

Third Embodiment

Figure 4:
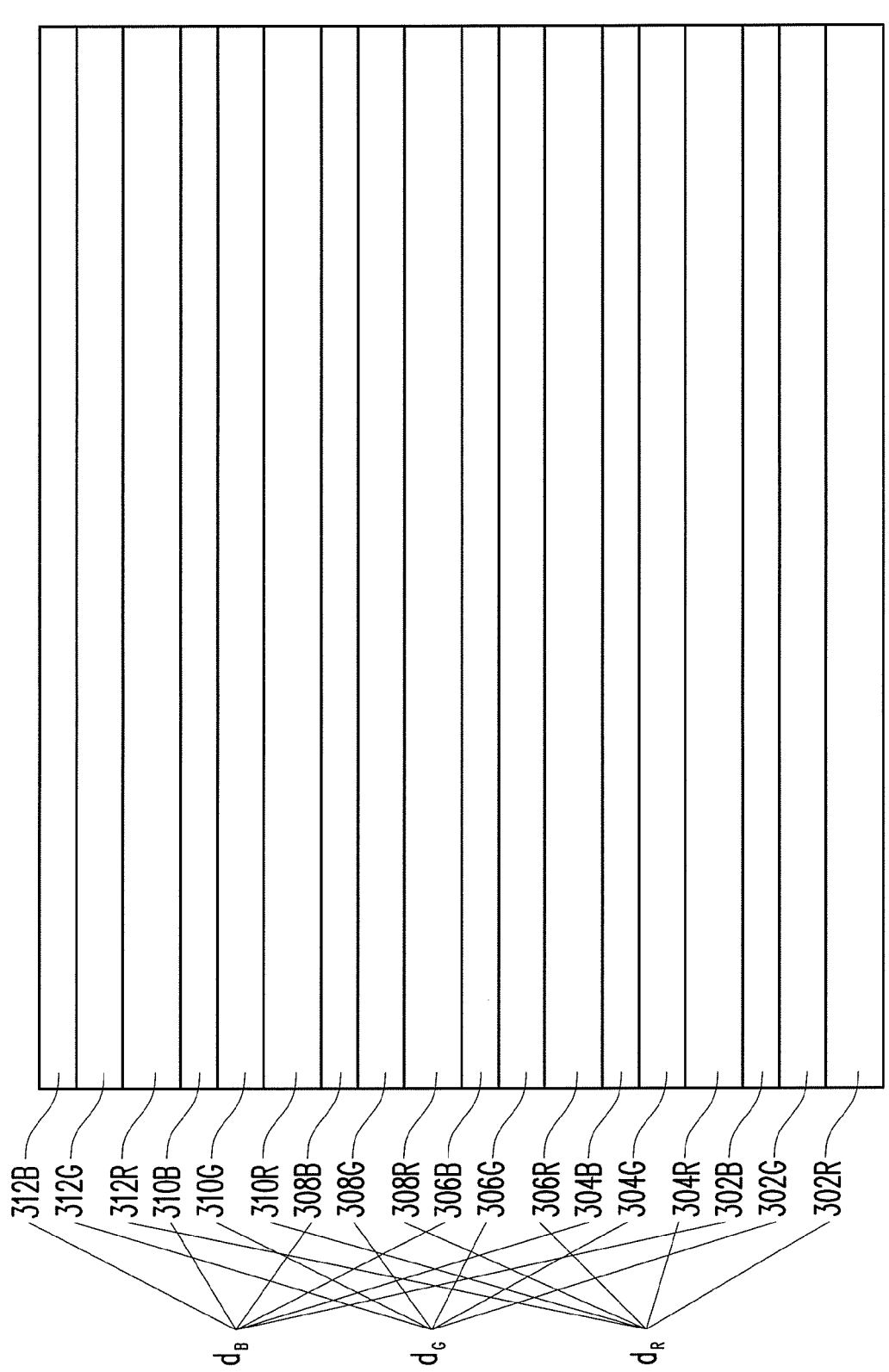
FIG. 4 is a cross-sectional view of an optical sheet according to a third embodiment of the present invention.

FIG. 4 is a cross-sectional view of an optical sheet according to a third embodiment of the present invention. Referring to FIG. 4, the present embodiment is similar to the second embodiment, and a difference there between lies in configuration of the optical anisotropic films 302R-312R, 302G-312G and 302B-312B forming the pitches $d_R$, $d_G$ and $d_B$. To be specific, in the optical sheet 400 of the present embodiment, each of the optical anisotropic films 302G-312G forming the pitch $d_G$ is, for example, located between each of the optical anisotropic films 302R-312R forming the pitch $d_R$ and each of the optical anisotropic films 302B-312B forming the pitch $d_B$.

However, in other embodiments, any of the optical anisotropic films 302R-312R, 302G-312G and 302B-312B forming the pitches $d_R$, $d_G$ and $d_B$ can also be alternately stacked. For example, one of the optical anisotropic film 302G forming the pitch $d_G$ is located between two of the optical anisotropic films 302R and 304R forming the pitch $d_R$, and one of the optical anisotropic film 304G forming the pitch $d_G$ is located between two of the optical anisotropic films 302B and 304B forming the pitch $d_B$, etc., though the present invention is not limited thereto. Moreover, each of the optical anisotropic films having the same pitch may have the same thickness or different thickness.

Fourth Embodiment

Figure 5:
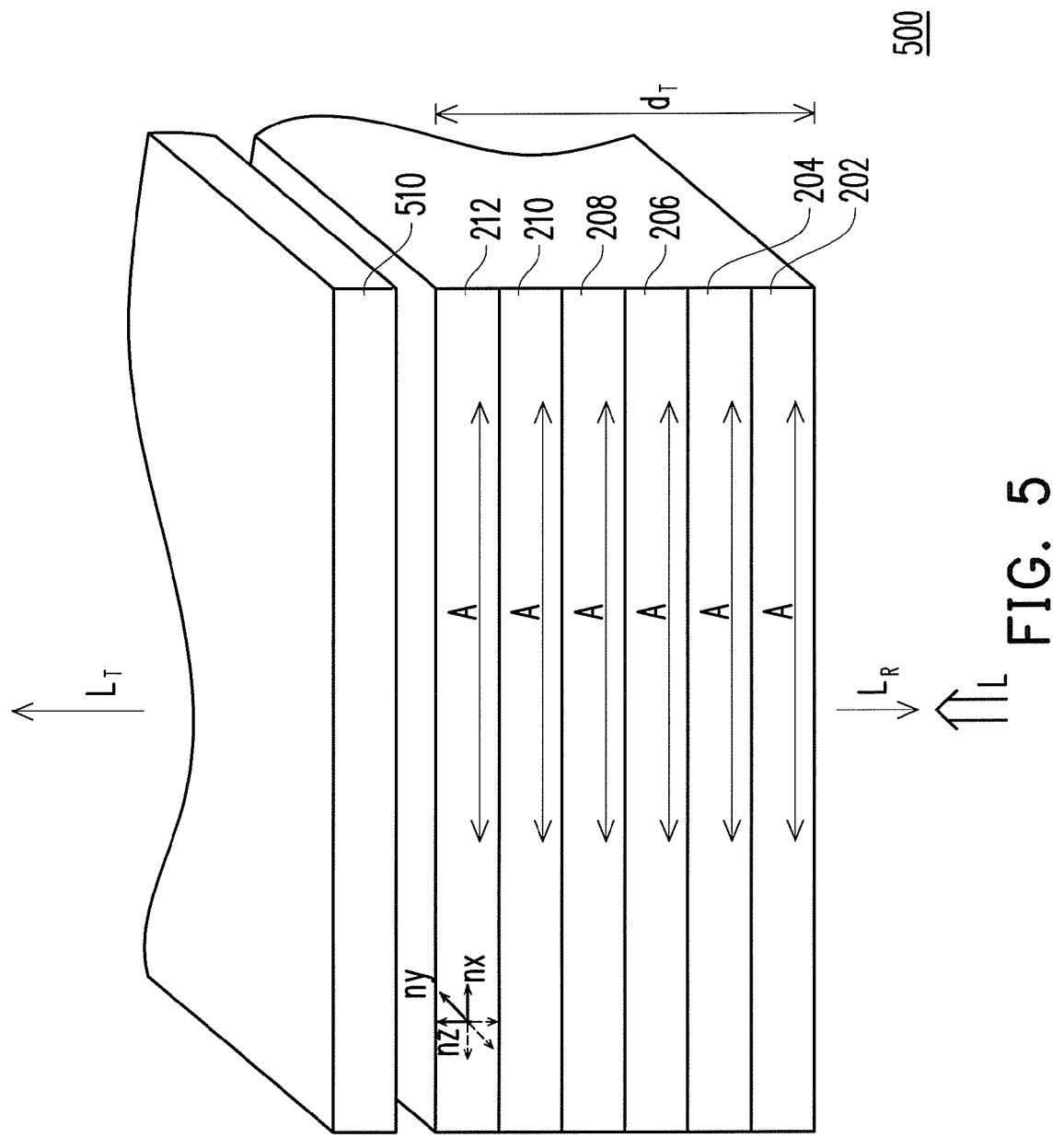
FIG. 5 is a cross-sectional view of an optical sheet according to a fourth embodiment of the present invention.

FIG. 5 is a cross-sectional view of an optical sheet according to the fourth embodiment of the present invention. Referring to FIG. 5, the present embodiment is similar to the third embodiment, and compared to the aforementioned embodiment, the optical sheet 500 of the present embodiment further includes a λ/4 phase retardation film 510, so that the optical sheet 500 forms a linear polarizer. Wherein, the optical anisotropic films 202-212 are mutually stacked, and the λ/4 phase retardation film 510 is for example, disposed on the optical anisotropic films.

As described above, the optical sheet 500 of the present embodiment has a feature of birefringence, so that the light L can be separated into two polarized light $L_T$ and $L_R$ with different polarization directions. The two polarized light $L_T$ and $L_R$ can be converted into linear polarized light based on configuration of the λ/4 phase retardation film 510.

Therefore, the optical sheet 500 of the present embodiment has the same advantages as that in the aforementioned embodiments, and when the optical sheet 500 is applied to the LCD, the energy depletion of the light source of the LCD can be reduced. Moreover, the optical sheet 500 can apply the various design structures of the aforementioned embodiments, so as to match various demands.

In summary, in the optical sheet of the present invention, by suitably configuring the optical axes of various optical anisotropic films, the polarized light with the specific polarization direction can be reflected for recycling. By applying the optical sheet of the present invention to the LCD, the energy depletion of the light source of the LCD can be reduced, and accordingly the brightness performance of the LCD can be improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical sheet, comprising:
a plurality of optical anisotropic films mutually stacked on one another, each of the optical anisotropic films having a plurality of main axis refractive indexes nx, ny and nz, wherein the main axis refractive indexes nx and ny of each optical anisotropic film are in-plane main axis refractive indexes, and the main axis refractive index nz of each optical anisotropic film is a thickness-wise refractive index, the main axis refractive index nx of each optical anisotropic film is a minimum or a maximum among the main axis refractive indexes nx, ny and nz of the optical anisotropic film, and each of the optical anisotropic films has an optical axis, and a direction of the optical axis is substantially the same to the main axis direction of the main axis refractive index nx, wherein the optical axes of the optical anisotropic films mutually stacked on one another sequentially rotate along a predetermined rotation direction in a thickness direction of the optical anisotropic films, and a total rotation angle of the stack is substantially greater than or equal to 360 degrees;
an included angle is formed between the optical axes of two adjacent optical anisotropic films, and the included angle of any two adjacent optical anisotropic films is less than or equal to 90 degrees;
when the total rotation angle of the optical axes rotating along a thickness direction of the optical anisotropic films is equal to 360 degrees, a sum of thicknesses of the optical anisotropic films forms a pitch, and the optical anisotropic films of the pitch are capable of reflecting a polarized light with a specific wavelength satisfying an equation of [(an extraordinary refractive index of the optical anisotropic film+an ordinary refractive index of the optical anisotropic film)/2]×the pitch; and
the thicknesses of the optical anisotropic films in the optical sheet are sequentially increased or decreased along a thickness direction of the optical sheet, and the included angles between the optical anisotropic films of the optical sheet are accordingly increased or decreased.

2. The optical sheet as claimed in claim 1, wherein the main axis refractive indexes nx, ny and nz of each of the optical anisotropic films satisfy an equation of ny=nz≠nx or nx≠ny≠nz.

3. The optical sheet as claimed in claim 1, wherein the main axis refractive index nx of each of the optical anisotropic films is the maximum among the main axis refractive indexes nx, ny and nz, and each of the optical anisotropic films has positive refractive index anisotropy.

4. The optical sheet as claimed in claim 1, wherein the predetermined rotation direction comprises a clockwise direction or an anticlockwise direction.

5. The optical sheet as claimed in claim 1, wherein the optical anisotropic films have a plurality of pitches, and a combination of the optical anisotropic films of each of the pitches is suitable for reflecting polarized light having different specific wavelengths.

6. The optical sheet as claimed in claim 5, wherein the optical anisotropic films have a first pitch, a second pitch and a third pitch, and one set of the optical anisotropic films forming the second pitch is located between one set of the optical anisotropic films forming the first pitch and one set of the optical anisotropic films forming the third pitch.

7. The optical sheet as claimed in claim 5, wherein the optical anisotropic films have a first pitch, a second pitch and a third pitch, and each of the optical anisotropic films forming the second pitch is located between each of the optical anisotropic films forming the first pitch and each of the optical anisotropic films forming the third pitch.

8. The optical sheet as claimed in claim 5, wherein the optical anisotropic films forming the same pitch have the same thickness.

9. The optical sheet as claimed in claim 5, wherein the optical anisotropic films forming the same pitch have different thickness.

10. The optical sheet as claimed in claim 1, wherein an included angle is formed between the optical axes of two adjacent optical anisotropic films, and the included angles of any two adjacent optical anisotropic films are equal.

11. The optical sheet as claimed in claim 1, wherein the optical sheet is a circular polarizer.

12. The optical sheet as claimed in claim 1, further comprises an optical isotropic film disposed between two of the adjacent optical anisotropic films.

13. An optical sheet, comprising:
a plurality of optical anisotropic films alternately stacked on one another, each of the optical anisotropic films having a plurality of main axis refractive indexes nx, ny and nz, wherein the main axis refractive indexes nx and ny of each optical anisotropic film are in-plane main axis refractive indexes, and the main axis refractive index nz of each optical anisotropic film is a thickness-wise refractive index, the main axis refractive index nx of each optical anisotropic film is a minimum or a maximum among the main axis refractive indexes nx, ny and nz, and each of the optical anisotropic films has an optical axis, and a direction of the optical axis is substantially the same to the main axis direction of the main axis refractive index nx, wherein the optical axes of the optical anisotropic films mutually stacked on one another sequentially rotate along a predetermined rotation direction in a thickness direction of the optical anisotropic films, and a total rotation angle of the stack is substantially greater than or equal to 360 degrees;
an included angle is formed between the optical axes of two adjacent optical anisotropic films, and the included angle of any two adjacent optical anisotropic films is less than or equal to 90 degrees;

when the total rotation angle of the optical axes rotating along a thickness direction of the optical anisotropic films is equal to 360 degrees, a sum of thicknesses of the optical anisotropic films forms a pitch, and the optical anisotropic films of the pitch are capable of reflecting a polarized light with a specific wavelength satisfying the equation of [(an extraordinary refractive index of the optical anisotropic film+an ordinary refractive index of the optical anisotropic film)/2]×the pitch;

the thicknesses of the optical anisotropic films in the optical sheet are sequentially increased or decreased along a thickness direction of the optical sheet, and the included angles between the optical anisotropic films of the optical sheet are accordingly increased or decreased; and a $\lambda/4$ phase retardation film, disposed on the optical anisotropic films.

14. The optical sheet as claimed in claim 13, wherein the optical sheet is a linear polarizer.

\* \* \* \* \*